(12) United States Patent
Cheon et al.

(10) Patent No.: US 7,736,793 B2
(45) Date of Patent: Jun. 15, 2010

(54) SECONDARY BATTERY WITH COLLECTOR PLATE AND ELECTRODE PACKAGE THEREOF

(75) Inventors: Sang-Eun Cheon, Suwon-si (KR); Ki-Ho Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 865 days.

(21) Appl. No.: 11/123,356

(22) Filed: May 3, 2005

(65) Prior Publication Data

US 2005/0277020 A1    Dec. 15, 2005

(30) Foreign Application Priority Data

May 4, 2004    (KR)    ............ 10-2004-0031307

(51) Int. Cl.
*H01M 4/00* (2006.01)
*H01M 2/10* (2006.01)

(52) U.S. Cl. .................. 429/94; 429/186; 429/208; 429/133; 429/146

(58) Field of Classification Search ............ 429/211, 429/161
See application file for complete search history.

(56) References Cited

U.S. PATENT DOCUMENTS

| | | | |
|---|---|---|---|
| 6,692,863 B1 * | 2/2004 | Nakanishi et al. ............ 429/94 |
| 2002/0004162 A1 * | 1/2002 | Satoh et al. ................ 429/94 |
| 2003/0104274 A1 * | 6/2003 | Wiepen ...................... 429/161 |
| 2004/0023108 A1 | 2/2004 | Nakanishi et al. |
| 2005/0214640 A1 * | 9/2005 | Kim .......................... 429/161 |

FOREIGN PATENT DOCUMENTS

| CN | 1481039 A | 3/2004 |
|---|---|---|
| JP | 49-109127 U | 9/1974 |
| JP | 52-98937 | 8/1977 |
| JP | 52-120922 U | 9/1977 |
| JP | 56-67173 A | 6/1981 |
| JP | 10-261441 A | 9/1998 |
| JP | 2000058038 A * | 2/2000 |
| JP | 2002-110134 A | 4/2002 |
| JP | 2002-298921 A | 10/2002 |

(Continued)

OTHER PUBLICATIONS

Korean Patent Abstracts, Publication No. 1020020082729; Publication Date Oct. 31, 2002; in the name of Kim et al.

(Continued)

*Primary Examiner*—Dah-Wei D Yuan
*Assistant Examiner*—Zachary Best
(74) *Attorney, Agent, or Firm*—Christie, Parker & Hale, LLP

(57) ABSTRACT

A secondary battery. An electrode assembly is mounted in a container. The electrode assembly is formed by winding a positive electrode and a negative electrode with respect to a separator interposed between the positive and negative electrodes. A cap assembly is fixed to the container to seal the container assembly to provide a terminal for electrical current. An uncoated region is formed along the edge of the length direction of the positive electrode or the negative electrode. The uncoated region is left uncoated with an active material. A collector plate includes a contact portion of the curved shape to be electrically connected to the uncoated region.

15 Claims, 7 Drawing Sheets

FOREIGN PATENT DOCUMENTS

| | | |
|---|---|---|
| JP | 2003-7346 | 1/2003 |
| JP | 2003-77447 A | 3/2003 |
| JP | 2003-77449 A | 3/2003 |
| KR | 2002-0082729 | 10/2002 |
| KR | 10-2004-0026260 | 3/2004 |
| KR | 10-2004-0026261 | 3/2004 |

OTHER PUBLICATIONS

Korean Patent Abstracts, Publication No. 1020040026260; Publication Date Mar. 31, 2004; in the name of Lee.

Korean Patent Abstracts, Publication No. 1020040026261; Publication Date Mar. 31, 2004; in the name of Bang.

Patent Abstract of Japan, Publication No. 2003-007346, Published on Jan. 10, 2003, in the name of Kito, et al.

* cited by examiner

SECONDARY BATTERY WITH COLLECTOR PLATE AND ELECTRODE PACKAGE THEREOF

CROSS-REFERENCE TO RELATED APPLICATIONS

This application claims priority to and the benefit of Korean Patent Application No. 10-2004-0031307 filed on May 4, 2004 in the Korean Intellectual Property Office, the entire content of which is incorporated herein by reference.

BACKGROUND OF THE INVENTION (a) Field of the Invention

The present invention relates to a secondary battery, and more particularly, to a collector plate for a secondary battery which improves the welding efficiency during the manufacturing process of the battery.

(b) Description of the Related Art

Depending on the use or the power capacity of a battery, secondary batteries may be classified into lower power batteries (hereinafter "small battery") in which one battery cell is made into a battery pack, and bulk size batteries (hereinafter "large battery") in which several to tens of the secondary battery cells are connected to form a pack.

Small batteries are used as a power source for various portable electronic devices such as cellular phones, laptop computers, and camcorders. Large batteries are suitable for motor driven devices such as the electric vehicles.

Generally, small batteries have square and cylindrical shapes when they are made of one cell. A small battery includes an electrode assembly (jellyroll) in which a positive plate, a negative plate, and a separator as an insulator interposed between the positive and negatives plates are spirally-wound. The electrode assembly is inserted inside a cylindrical container to form the battery.

Lead terminals, that is, conductive tabs which collect the current produced from the positive and negative electrodes, are attached to the positive and negative plates. The conductive tab is fixed to the electrode assembly by welding to induce the current from the positive and negative electrodes to the positive and negative terminals.

When the above structure of a small battery is applied to a large battery, the dynamic kinetics necessary for large batteries may not be satisfied in terms of capacity and power. Accordingly, secondary batteries have been provided which include the multi-tab structure disclosed in, for example, Japanese Patent Publication No. 2003-7346, in which multiple tabs are attached to the electrode assembly. This secondary battery has a plurality of tabs formed along one direction of the electrode, and the tabs are fixed to an internal terminal which is connected with an external terminal.

The tabs of the secondary battery with the above structure may be integrally formed with a collector plate, or separately formed and welded to a collector plate.

However, when the tabs are integrally formed with the collector plate, material for the collector plate is wasted and the battery may not be able to satisfy the power characteristics required for the large battery. Additionally, when the tabs are separately formed, a large workforce is needed.

When the tabs are welded, heat generated from the tabs influences the electrode assembly. To minimize this influence, the tabs may have a relatively long length. However, long tabs occupy more space inside the battery, which in turn decreases the energy density per volume.

Additionally, a pack unit of the large battery used for hybrid electric vehicles requires high power dynamic kinetics due to its use characteristics. Accordingly, it is necessary that the tabs be designed to minimize the resistance element generated during the current collection process. However, since the above mentioned battery collects current through the tab with a small unit area, there is a problem that the resistance increases, which thereby decreases the collecting efficiency.

SUMMARY OF THE INVENTION

A secondary battery is provided which increases the welding efficiency and the collecting efficiency of the battery. The secondary battery provided also has high instantaneous power so that it may be applied to industrial fields such as hybrid electric vehicles requiring a bulk size battery.

According to one embodiment of the present invention, a secondary battery includes a container; an electrode assembly including a positive electrode and a negative electrode, and a separator interposed between those two electrodes, the electrode assembly being mounted in the container; a cap assembly fixed to the container to seal the container; and a collector plate including a curved contact portion to be electrically connected to one of the positive and negative electrodes.

The positive or negative electrode can have an uncoated region absent active material along the edge thereof, and the contact portion may make contact and be fixed to the uncoated region.

In one exemplary embodiment the uncoated regions are formed in the positive electrode and the negative electrode being opposite to each other, and the uncoated regions are electrically connected to a positive and negative collector plate, respectively. At least one of the collector plates has an injection portion formed by cutting a part of the plate along the contact portion.

Alternatively, the collector plate may have two or more contact portions, the contact portions being uniformly arranged with respect to the center of the collector plate.

The contact portion may be formed in a spiral shape from the center outward, and also the injection portion may be formed in a spiral shape from the center outward and arranged in between the contact portion.

The secondary battery may have a cylindrical or hexahedron shape.

According to another embodiment of the present invention, an electrode package for a secondary battery includes an electrode assembly formed by winding a positive electrode and a negative electrode with respect to a separator interposed between those two electrodes; and a collector plate including a curved contact portion to be electrically connected to one of the positive and negative electrodes.

The electrode can have an uncoated region absent active material along the edge thereof, and the contact portion can be contacted with and fixed to the uncoated region.

In addition, according to another embodiment of the present invention, a collector plate for a secondary battery includes a plate; a contact portion protruding from the plate, the contact portion having a curved shape; and an injection portion formed by cutting a part of the plate along the contact portion.

DETAILED DESCRIPTION

Figure 1:
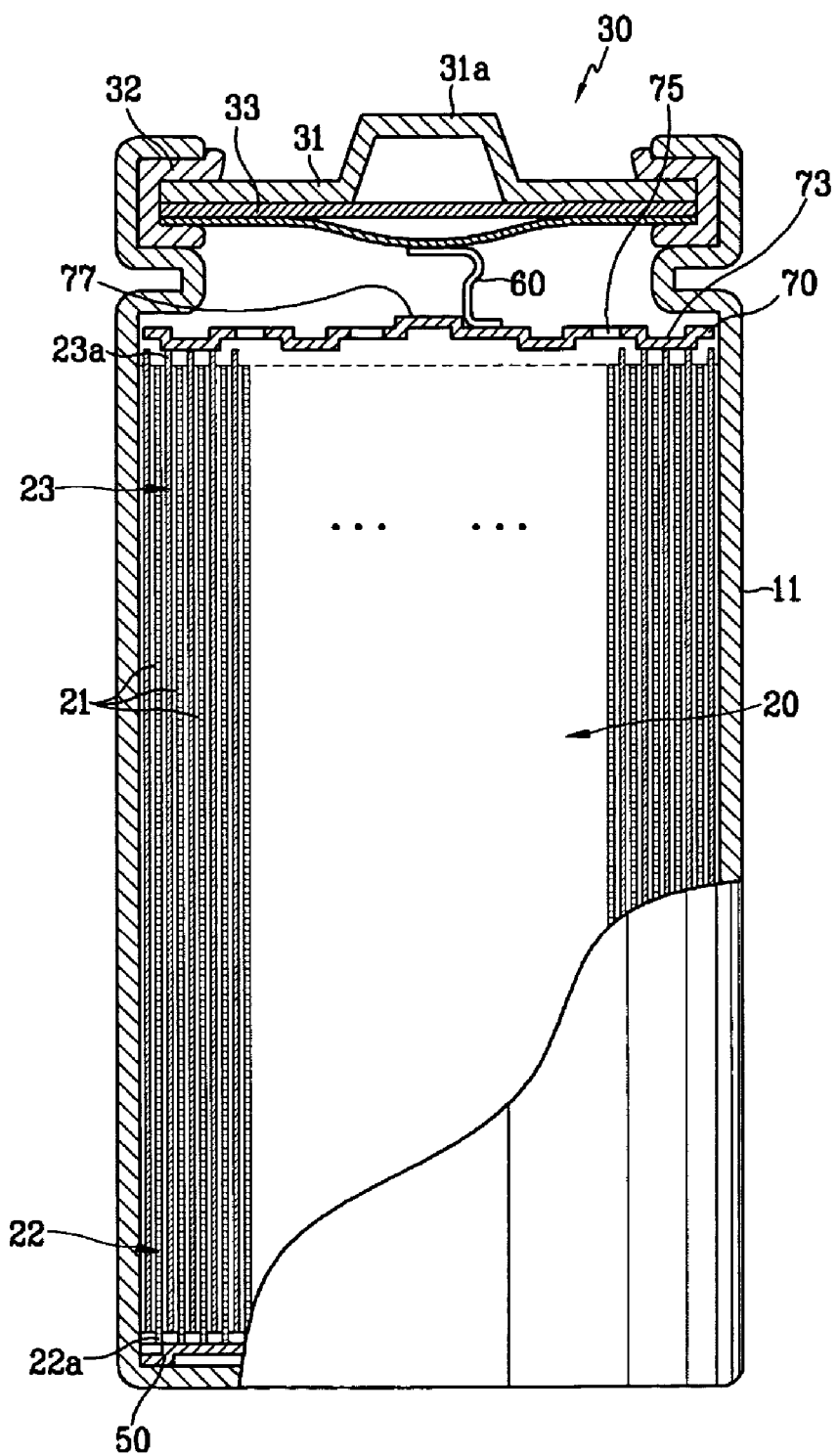
FIG. 1 is a cross-sectional view of a secondary battery according to an exemplary embodiment of the present invention.
Figure 2:
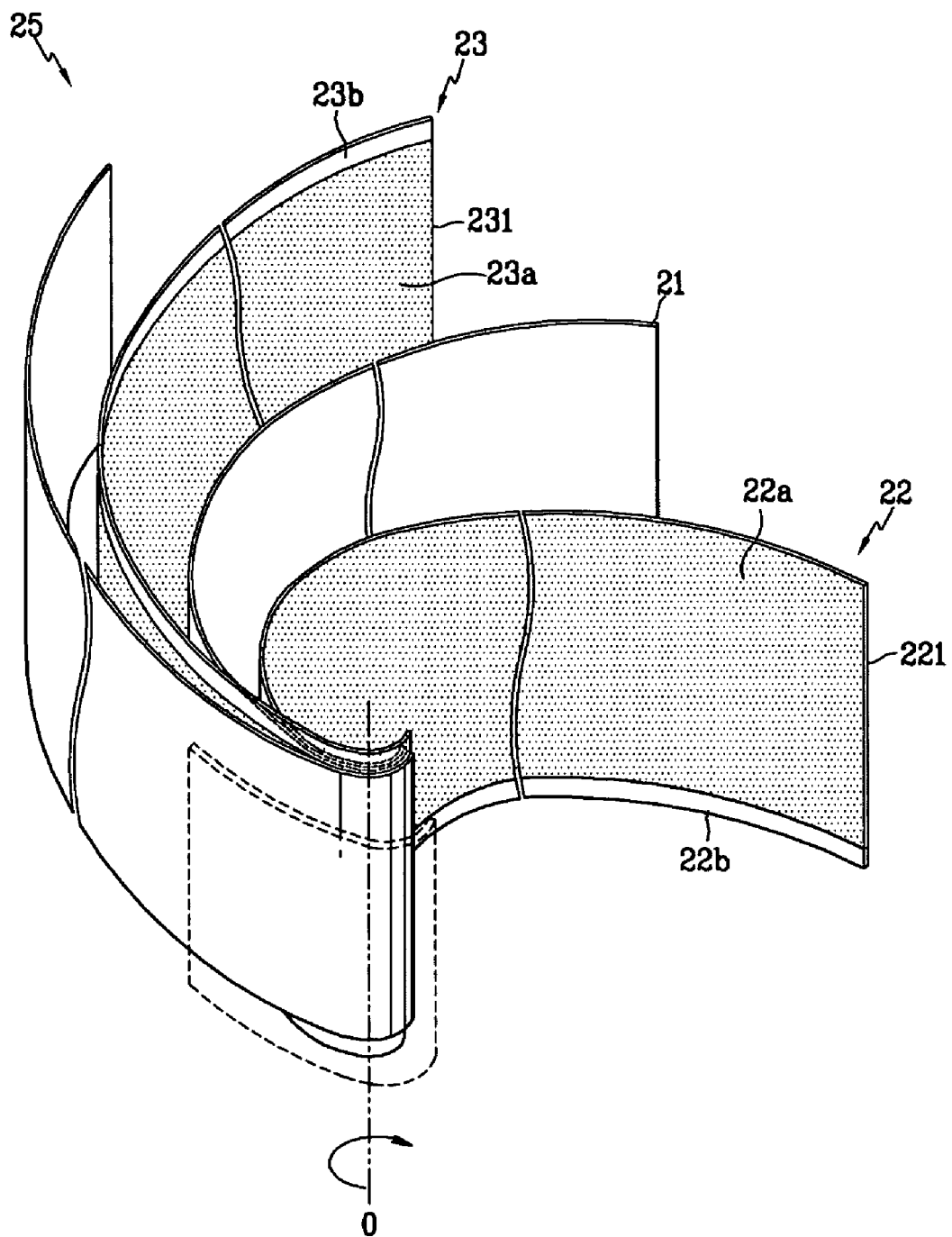
FIG. 2 is a perspective view of an electrode assembly according to an exemplary embodiment of the present invention.

As shown in FIGS. 1 and 2, the secondary battery of the present embodiment includes a container 11 of a cylindrical or hexahedron shape having an opening, an electrode package 20 mounted in the container and formed by winding a positive collector 221, a negative collector 231 and a separator 21 of conductive material interposed between the collectors, and a cap assembly 30 sealing the opening of the container 11 through a gasket 32.

The container 11 is made of conductive metal such as aluminum, aluminum alloy or steel plated with nickel. The container's shape may be any shape that has a space to receive the electrode package 20, for example, a cylinder.

The electrode package 20 has an electrode assembly 25 (FIG. 2) formed by winding a positive electrode 23, a negative electrode 22, and the separator 21 interposed between the positive and negative electrodes, and a collector plate selectively connected to uncoated regions 22b, 23b formed along the edge (the upper and lower portions of the positive and negative collectors in the drawing) of the electrode assembly 25. The details of the electrode package 20 will be described in the following text with reference to the drawings.

FIG. 1 shows an exemplary electrode package 20 of a jellyroll configuration mounted in the container 11 of a cylindrical shape. However, the present invention is not limited to this shape or configuration.

The cap assembly 30 includes a cap plate 31 having an external terminal 31a, and a gasket 32 insulating the cap plate 31 from the container 11. The cap assembly 30 can further include a vent plate 33 having a safety vent (not shown) which has a space for buffering the internal pressure and may be fractured at a prescribed pressure level to discharge the gas and thereby prevent the explosion of the battery. The safety vent is not limited to the one formed on the vent plate 33, but rather may be modified into various configurations as long as it serves to cut off the electrical connection between the electrode package 20 and the external terminal 31a at a prescribed pressure level.

The cap assembly 30 with the above structure is electrically connected to the electrode package 20 of an embodiment the present invention through a lead wire 60.

The following will describe the electrode package according to an exemplary embodiment of the present embodiment.

FIG. 2 is an exploded perspective view of an electrode assembly forming a part of the electrode package according to an exemplary embodiment.

In an exemplary embodiment, the electrode assembly 25 is formed by winding a positive electrode 23, a negative electrode 22, and a separator 21 interposed between the electrodes. The positive electrode 23 and the negative electrode 22 have uncoated regions 22b, 23b lengthwise along one edge.

The positive electrode 23 and the negative electrode 22 are formed by coating positive and negative active materials 22a, 23a, respectively on the corresponding collectors 221, 231, respectively, and they are wound into a jellyroll configuration to form the electrode assembly 25.

The electrode assembly 25 may have a winding core (not shown) at the center thereof to facilitate winding the plates 23, 22 and to maintain the shape.

The positive electrode 23 and the negative electrode 22 have uncoated regions 22b, 23b along one lengthwise edge of the collectors 221, 231, respectively. The positive and negative uncoated regions 22b, 23b are at opposite ends of the electrode assembly 25.

When the positive and negative electrodes 22, 23 are wound, the uncoated regions 22b, 23b are arranged such that the positive uncoated region 23b is located over the electrode assembly 25 (in the direction of the cap assembly 30) and the negative uncoated region 22b is located under the electrode assembly (in the direction away from the cap assembly). Accordingly, the overall shape is such that the positive uncoated region 23b protrudes over the electrode assembly 25 and the negative uncoated region 22b protrudes under the electrode assembly 25.

Figure 3:
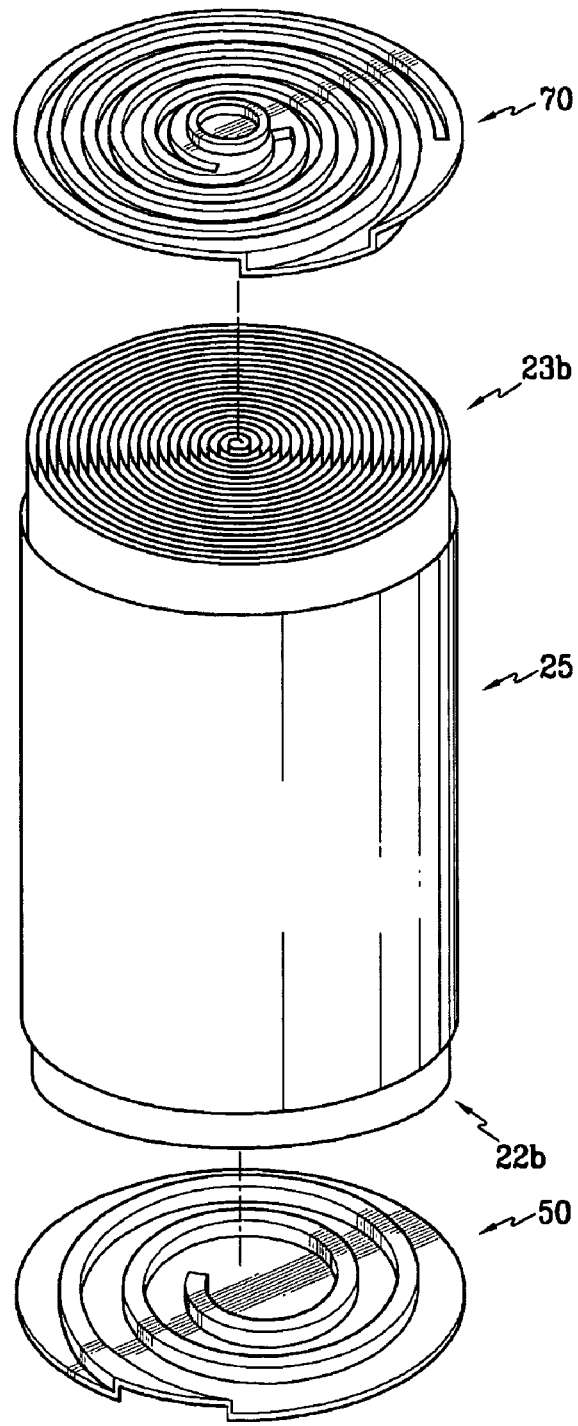
FIG. 3 is an exploded perspective view of an electrode package according to an exemplary embodiment of the present invention.

As shown in FIG. 3, a positive collector plate 70 is disposed over the electrode assembly 25 facing the positive uncoated region 23b and a negative collector plate 50 is disposed under the electrode assembly 25 facing the negative uncoated region 22b. Both the positive and negative collector plates 50, 70 are fixed to the electrode assembly 25 by welding to thereby form the electrode package 20.

The positive collector plate 70 located over the electrode assembly 25 is electrically connected to the cap assembly 30 to form a cathode of the battery. The negative collector plate 50 located under the electrode assembly 25 is electrically connected to the container 11 to form an anode of the battery.

Figure 4:
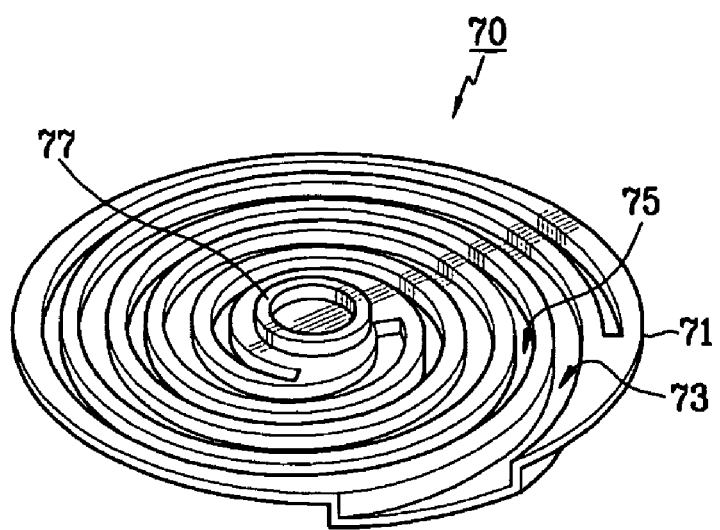
FIG. 4 is a perspective view of a positive collector plate according to an exemplary embodiment of the present invention.

Referring to FIGS. 4-7, the details of an exemplary collector plate of the present invention will be described. FIG. 4 is a drawing of the positive collector plate 70 according to an exemplary embodiment of the present invention.

As shown in the drawing, the positive collector plate 70 includes a plate 71, a contact portion 73 protruding in a spiral shape from the center outward, and an injection portion 75 formed by cutting a part of the plate 71 in between the contact portion.

The contact portion 73 may be formed in a slit shape, and the protruding portion of the contact portion faces the uncoated region 23b of the positive electrode 23 of the electrode assembly. The bottom surface of the contact portion 73 is flat, which facilitates laser welding with the uncoated region 23b.

The shape of the plate 71 is not limited to the disk shape as shown in FIG. 4, but may be other polygonal shapes such as a triangle or square.

The contact portion 73 may be formed by a beading process of the disk-shaped plate 71, and in one exemplary embodiment has a spiral configuration starting from the center of the plate 71 and ending at the outer edge.

With the structure of such a contact portion 73, the contact area between the collector plate 70 and the uncoated region 23b of the positive electrode 23 is increased, thereby decreasing the contact resistance between two members 70 and 23 and allowing higher current collecting efficiency than a conventional tab structure.

In between the contact portion 73, the injection portion 75 may be formed to allow the injection of electrolyte. The injection portion 75 is an opening extending between the top and bottom portions of the plate 71, and has a spiral configuration starting from the center of the plate 71 and ending at the outer edge.

Accordingly, the passage for supplying an electrolyte to the electrode assembly may be formed such that electrolyte can be uniformly supplied to all parts of the electrode assembly including the center and outer portions.

Figure 6:
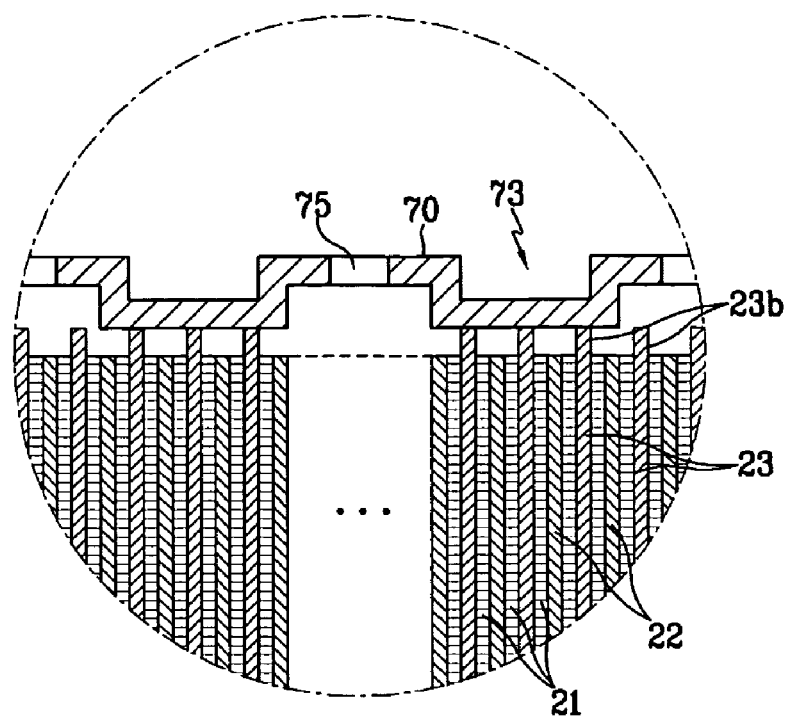
FIG. 6 is a partial enlarged cross-sectional view illustrating the contact structure of a positive uncoated region and a positive collector plate according to another embodiment of the present invention.

The collector plate 70 is disposed over the electrode assembly such that it is in contact with the uncoated region 23b of the positive electrode 23. Then the collector plate 70 is electrically connected to the uncoated region 23b by laser welding the collector plate to the uncoated region (FIG. 6).

Figure 5:
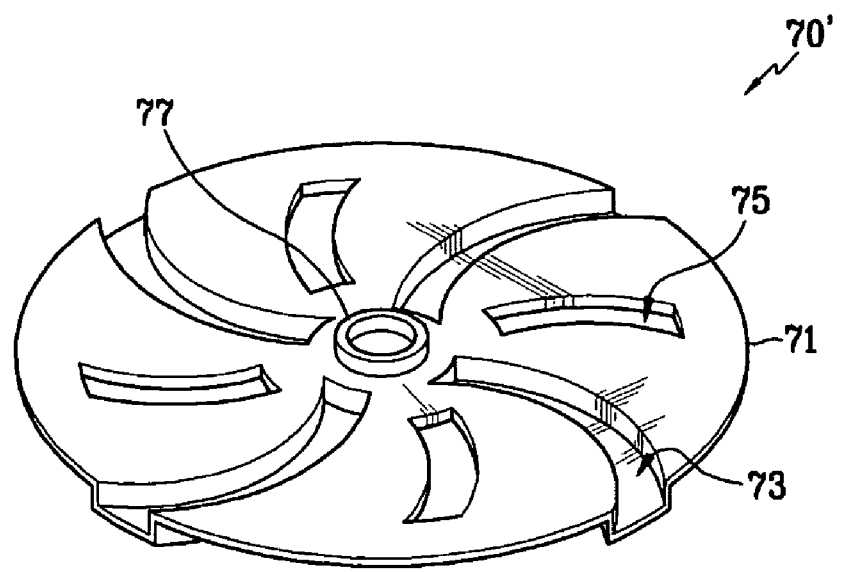
FIG. 5 is a perspective view of a positive collector plate according to another embodiment of the present invention.

Alternatively, the collector plate 70 may have a shape as shown in FIG. 5 in which the collector plate has at least two injection portions 75 uniformly arranged with respect to the center of the plate 71. FIG. 5 shows an exemplary collector plate 70' having four contact portions 73 and injection portions 75 formed between the contact portions 73.

Figure 7:
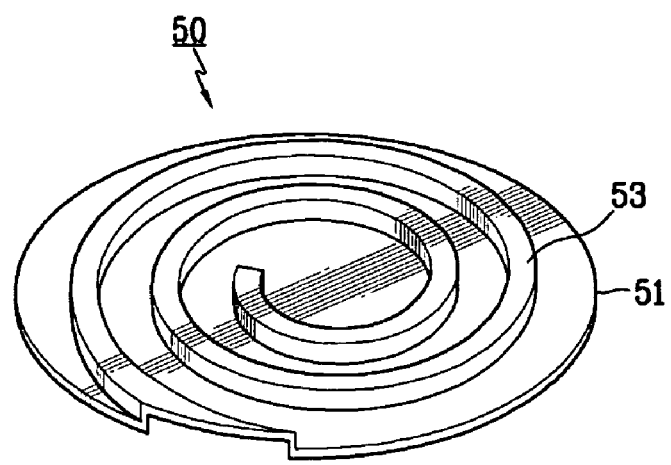
FIG. 7 is a perspective view of a negative collector plate according to another embodiment of the present invention.

The structure of the positive collector plates 70, 70' can be applied to a negative collector plate 50 as shown in FIG. 7. That is, the contact portion 53 can be formed by a beading process of the plate 51 to face the uncoated region 22b of the negative electrode 22. In the embodiment shown in FIG. 7, the contact portion 53 has a spiral configuration starting from the center and ending at the outer edge which is the same as that of the positive collector plate 70.

The negative collector plate 50 may be fixed to the uncoated region 22b of the negative electrode 22 by laser welding the uncoated region 22b along the contact portion 53.

The electrode package 20 may be formed by fixing the collector plates 70, 50 to the upper and lower portions of the electrode assembly, respectively. The electrode package 20 may then be mounted in the container 11 with the positive collector plate 70 facing the cap assembly 30. Additionally, the negative collector plate 50 connected to the negative electrode 22 contacts the bottom surface of the container 11 and is fixed to the bottom surface by resistance welding.

A bar for welding (not shown) may be inserted inside the container 11 through a center hole 77 (FIG. 4) formed in the center of the positive collector plate 70, for fixing the negative collector plate 50 to the container. Accordingly, the container 11 forms the anode of the battery.

Alternatively, the uncoated region 22b may be contacted directly with the container 11 without the negative collector plate 50 to form the anode of the battery.

Once the cathode has been formed, the electrolyte is supplied inside the container 11 through the injection portion 75 of the positive collector plate 70. Furthermore, the positive collector plate 70 is electrically connected to the positive electrode 23 which is electrically connected to the cap assembly 30 through the lead wire 60. Accordingly, the cap assembly 30 forms the cathode of the battery.

The process for welding the collector plates 50, 70 to the respective uncoated region 22b, 23b of the electrode assembly 25 may be carried out as follows: In one embodiment, the laser welding machine moves in a spiral configuration along the contact portions 53, 73 formed in the respective collector plate 50, 70 to weld the respective uncoated region 22b, 23b to the appropriate collector plate. In another embodiment, the laser welding machine moves linearly at a constant speed, and the respective combined collector plate 50, 70 and electrode assembly 25 are rotated. The laser beam thereby moves along the contact portion 53, 73 formed in the respective collector plate 50, 70 and welds the uncoated region 22b, 23b to the collector plate.

Figure 8:
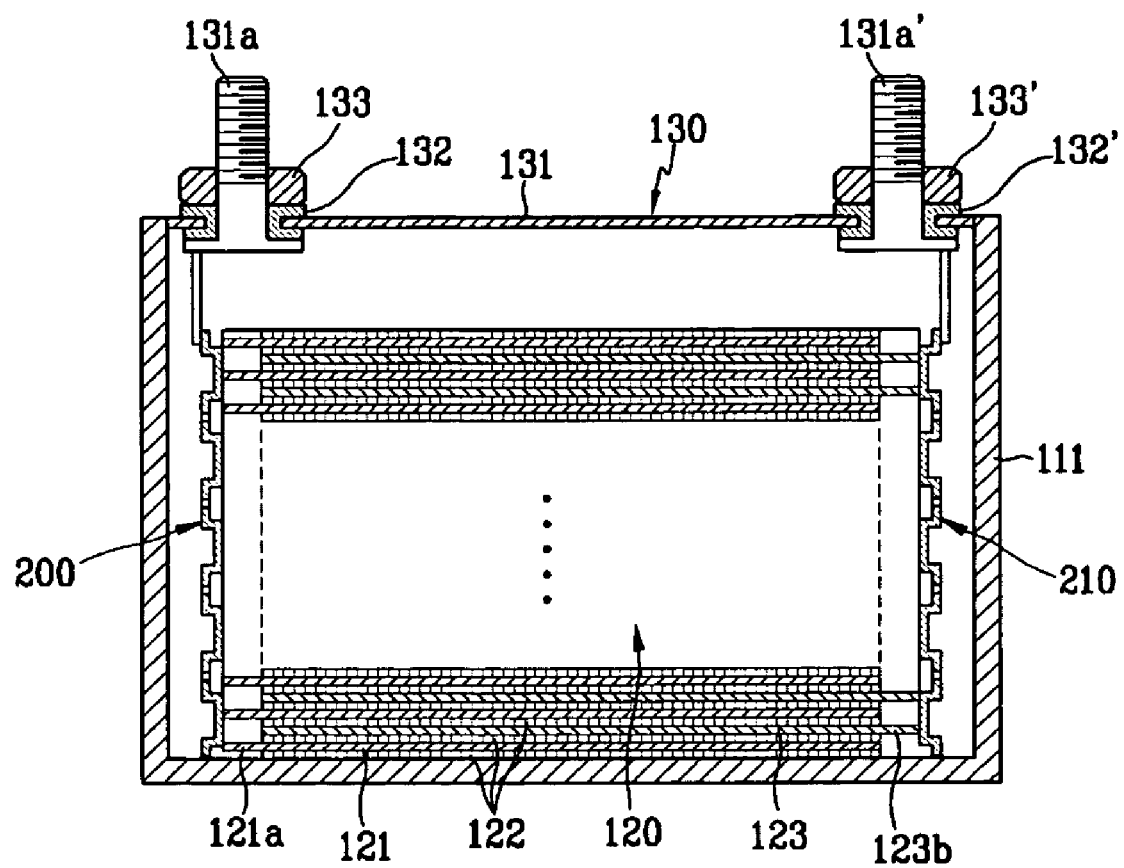
FIG. 8 is a cross-section view of a secondary battery according to another embodiment of the present invention.
Figure 9:
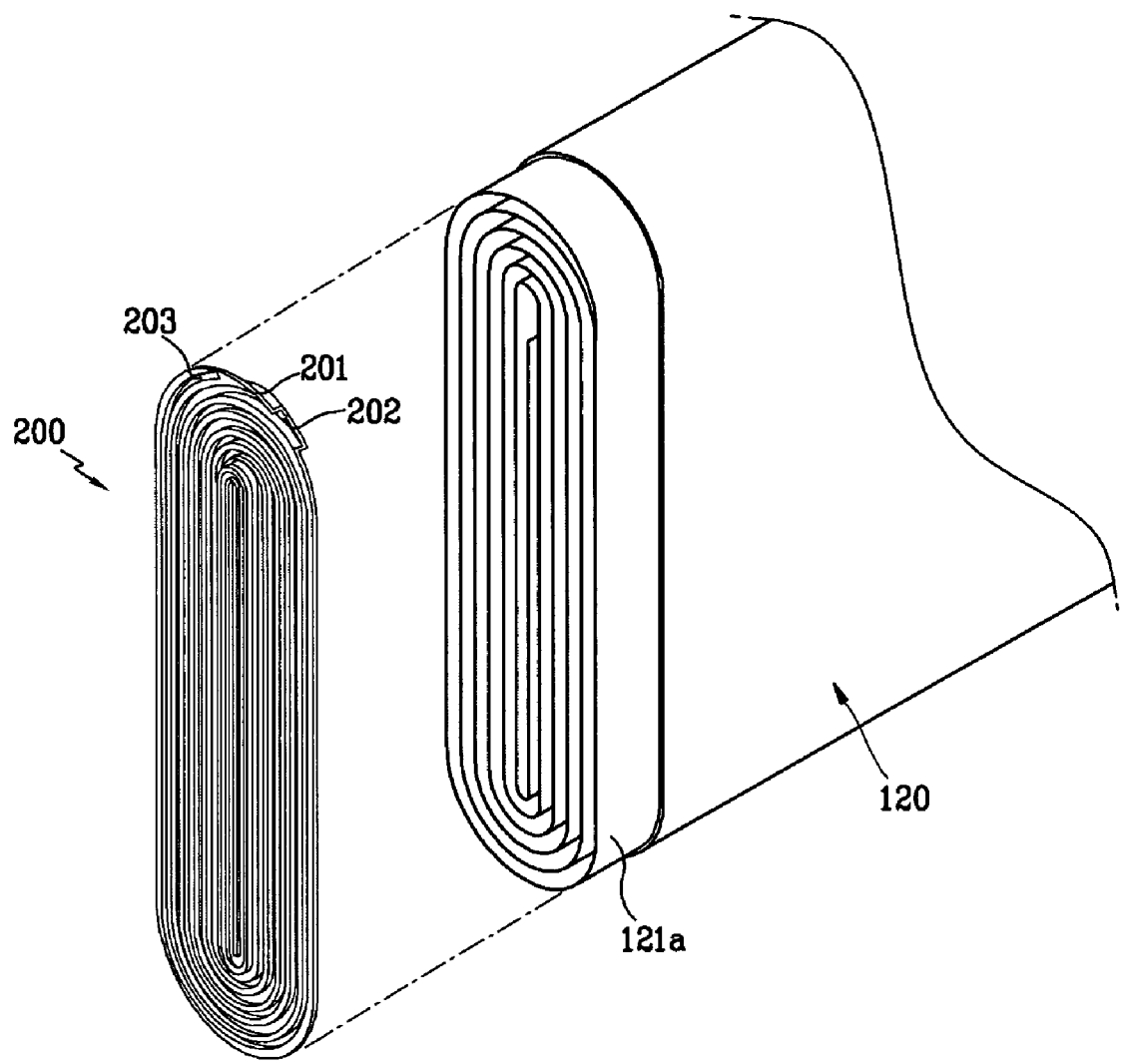
FIG. 9 is a perspective view of a collector plate for a secondary battery according to the third embodiment of the present invention.

Additionally, FIGS. 8 and 9 show an example of the secondary battery with a hexahedron-shaped container.

As shown in the drawings, the secondary battery includes a container 111 of a hexahedron shape having an opening, an electrode package 120 formed by winding a positive electrode 121, a negative electrode 123 and a separator 122 of conductive material interposed between the electrodes 121, 123, and a cap assembly 130 sealing the opening of the container 111.

The container 111 is made of conductive metal such as aluminum, aluminum alloy, and steel plated with nickel. The container 111 may have any shape which has a space to receive the electrode package 120, for example, a square.

The electrode package 120 has an electrode assembly formed by winding a positive electrode 121, a negative electrode 123 and the separator 122 interposed between those electrodes, and collector plates 200, 210 selectively connected to uncoated regions 121a, 123b formed along the edge (the upper and lower portions in the drawing) of the electrode assembly. The details of the electrode package 120 will be described in the following text.

The cap assembly 130 includes a cap plate 131 having external terminals 131a, 131a', and gaskets 132, 132' insulating the cap plate 131 from the external terminals.

The terminals 131a, 131a' are fastened and fixed to respective screws formed in the outer circumference through nuts 133, 133' and are electrically connected to the collectors 200, 210 respectively within the container 111.

As shown in the embodiment of FIG. 9, the positive collector plate 200 includes a plate 201 having an elliptical shape corresponding to the hexahedron-shaped electrode assembly, a contact portion 202 protruding in a spiral shape from the center outward, and an injection portion 203 formed by cutting a part of the plate 201 between the contact portion. The elliptical embodiment is similar to the embodiment shown in FIG. 3. The contact portion 202 may be formed in a slit shape similar to the embodiment in FIG. 4, and a protruding portion of the contact portion faces the uncoated region 121a of the positive electrode 121 of the electrode assembly. The bottom surface of the contact portion 202 is flat, which facilitates laser welding the contact portion to the uncoated region 121b.

The contact portion 202 may be formed by a beading process of the plate 201, and in one exemplary embodiment has a spiral configuration starting from the center of the plate 201 and ending at the outer edge.

With the structure of such a contact portion 202, the contact area between the collector plate 201 and the uncoated region 121b of the positive electrode 121 is increased, thereby decreasing the contact resistance between two members and allowing higher current collecting efficiency than a conventional tab structure.

In between the contact portion 202, the injection portion 203 is formed to allow the injection of an electrolyte. The injection portion 203 is an opening which extends through the top and bottom portion of the plate 201. The injection portion 203 has a spiral configuration starting from the center of the plate 201 and ending at the outer edge. Accordingly, a passage for supplying electrolyte to the electrode assembly is formed, allowing the electrolyte to be uniformly supplied to the electrode assembly including the center and outer portions.

According to exemplary embodiments of the present invention, since the contact area between a collector plate and an uncoated region is increased, the contact resistance between the two members is decreased and the collecting efficiency is enhanced. Furthermore, exact welding can be achieved during the manufacturing process.

Moreover, since the present invention can provide the dynamic kinetics necessary for bulk size batteries, the fixing between the collector plate and the electrode assembly can be effectively carried out. Accordingly, this solves some problems of the conventional art, and allows charge and discharge of a battery within a short time.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A secondary battery comprising:
   a container;
   an electrode assembly in the container including a positive electrode, a negative electrode, and a separator between the positive electrode and the negative electrode,
   a cap assembly fixed to the container to seal the container; and
   at least one collector plate having a planar surface and at least one contact portion protruding from the planar surface and curved in a plane parallel to the planar surface, the at least one contact portion having a planar contact surface,
   wherein only the planar contact surface contacts the positive electrode or the negative electrode to electrically connect the at least one collector plate to the positive electrode or to the negative electrode.

2. The secondary battery of claim 1, wherein at least one electrode of the positive electrode and the negative electrode has an edge having an uncoated region absent active material, and wherein the at least one contact portion is coupled to the uncoated region.

3. The secondary battery of claim 1,
   wherein the positive electrode and the negative electrode each have an edge having an uncoated region absent active material; and
   wherein the at least one collector plate comprises a first collector plate electrically connected to the uncoated region of the positive electrode and a second collector plate electrically connected to the uncoated region of the negative electrode.

4. The secondary battery of claim 1, wherein the at least one collector plate has an injection portion adjacent to the at least one contact portion for supplying electrolyte to the electrode assembly.

5. The secondary battery of claim 1, wherein the at least one contact portion comprises a plurality of contact portions symmetrically arranged with respect to a center of a corresponding one of the at least one collector plate.

6. The secondary battery of claim 1, wherein the at least one contact portion spirals outward from a center of a corresponding one of the at least one collector plate.

7. The secondary battery of claim 4, wherein the injection portion is in a continuous outward spiral configuration from a center of a corresponding one of the at least one collector plate, and wherein the injection portion is between two of the at least one contact portions.

8. The secondary battery of claim 1, wherein the at least one contact portion is a slit.

9. The secondary battery of claim 1, wherein the container has a cylindrical shape.

10. The secondary battery of claim 1, wherein the container has a hexahedron shape.

11. An electrode package for a secondary battery comprising:
    an electrode assembly in a wound configuration including a positive electrode, a negative electrode and a separator between the positive electrode and the negative electrode; and
    at least one collector plate having a planar surface and at least one contact portion protruding from the planar surface and curved in a plane parallel to the planar surface, the at least one contact portion having a planar contact surface, wherein only the planar contact surface contacts the positive electrode or the negative electrode to electrically connect the at least one collector plate to the positive electrode or to the negative electrode.

12. The electrode package for a secondary battery of claim 11, wherein at least one of the positive electrode and the negative electrode has an edge having an uncoated region absent active material, and wherein the at least one contact portion is coupled to the uncoated region.

13. The electrode package for a secondary battery of claim 11,
    wherein the positive electrode and the negative electrode each have an edge having an uncoated region absent active material;
    the uncoated region of the positive electrode is opposite the uncoated region of the negative electrode; and
    wherein the at least one collector plate comprises a first-collector plate electrically connected to the uncoated region on the positive electrode and a second collector plate electrically connected to the uncoated region on the negative electrode.

14. The electrode package for a secondary battery of claim 11, wherein the at least one collector plate has an injection portion adjacent to the at least one contact portion for supplying electrolyte to the electrode assembly.

15. The electrode package for a secondary battery of claim 11, wherein an orientation of the at least one contact portion substantially corresponds to an edge of the electrode assembly.

* * * * *